United States Patent
Gall et al.

(10) Patent No.: US 10,683,998 B2
(45) Date of Patent: Jun. 16, 2020

(54) LIGHT STAND FOR ORIENTING A LIGHT IN A VARIETY OF POSITIONS

(71) Applicant: MILWAUKEE ELECTRIC TOOL CORPORATION, Brookfield, WI (US)

(72) Inventors: Benjamin D. Gall, Milwaukee, WI (US); Josh Adams, Milwaukee, WI (US); Jason D. Thurner, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/418,393

(22) Filed: May 21, 2019

(65) Prior Publication Data

US 2019/0360671 A1 Nov. 28, 2019

Related U.S. Application Data

(60) Provisional application No. 62/674,819, filed on May 22, 2018.

(51) Int. Cl.
*F21V 21/22* (2006.01)
*F16M 11/28* (2006.01)
(Continued)

(52) U.S. Cl.
CPC .............. *F21V 21/22* (2013.01); *F16M 11/12* (2013.01); *F16M 11/242* (2013.01);
(Continued)

(58) Field of Classification Search
CPC ......... F21V 21/22; F21V 21/30; F16M 11/28; F16M 11/242; F16M 11/12
See application file for complete search history.

(56) References Cited

U.S. PATENT DOCUMENTS

| | | |
|---|---|---|
| 5,126,928 A | 6/1992 | Hughes |
| 8,262,248 B2 | 9/2012 | Wessel |

(Continued)

FOREIGN PATENT DOCUMENTS

| | | |
|---|---|---|
| CN | 2867392 Y | 2/2007 |
| CN | 201917754 U | 8/2011 |

(Continued)

*Primary Examiner* — Joseph L Williams
(74) *Attorney, Agent, or Firm* — Michael Best & Friedrich LLP (57) ABSTRACT

A light stand includes a telescoping assembly having a longitudinal axis, a light selectively coupled to the telescoping assembly, and a support assembly having legs coupled to the telescoping assembly. The support assembly is moveable between a collapsed position and an operating position. The light stand further includes a positioning linkage coupled between the light and the telescoping assembly for enabling the light to be oriented in a variety of positions. The positioning linkage includes a first adjustment axis about which the light rotates. The first adjustment axis is perpendicular to the longitudinal axis. The positioning linkage further includes a second adjustment axis about which the light rotates. The second adjustment linkage is perpendicular to the first adjustment axis. The positioning linkage further includes a third adjustment axis about which the light rotates. The third adjustment axis is perpendicular to a length of the positioning linkage.

20 Claims, 7 Drawing Sheets

(51) Int. Cl.
  *F16M 11/24* (2006.01)
  *F16M 11/12* (2006.01)
  *F21V 21/30* (2006.01)
  *F21W 131/10* (2006.01)

(52) U.S. Cl.
  CPC ............ *F16M 11/28* (2013.01); *F21V 21/30* (2013.01); *F16M 2200/022* (2013.01); *F21W 2131/1005* (2013.01)

(56) References Cited

U.S. PATENT DOCUMENTS

| | | |
|---|---|---|
| 8,939,602 B2 | 1/2015 | Wessel |
| 9,170,006 B2 | 10/2015 | Cugini et al. |
| 9,222,633 B2 | 12/2015 | Inskeep |
| 2016/0312967 A1 | 10/2016 | Harvey et al. |
| 2017/0350577 A1 | 12/2017 | Harvey et al. |

FOREIGN PATENT DOCUMENTS

| | | |
|---|---|---|
| CN | 102937772 A | 2/2013 |
| CN | 202914996 U | 5/2013 |
| CN | 105953055 A | 9/2016 |
| CN | 205782178 U | 12/2016 |
| CN | 205859538 U | 1/2017 |
| DE | 20205726 U1 | 8/2003 |
| DE | 102016118983 B3 | 1/2018 |
| WO | 15080767 A1 | 6/2015 |

LIGHT STAND FOR ORIENTING A LIGHT IN A VARIETY OF POSITIONS

CROSS-REFERENCE TO RELATED APPLICATIONS

This application claims priority to co-pending U.S. Provisional Patent Application No. 62/674,819, filed May 22, 2018, the entire contents of which are incorporated herein by reference.

FIELD OF THE INVENTION

The present invention relates to work lights and, more particularly, to foldable stands for work lights.

BACKGROUND OF THE INVENTION

Area work lights are typically used to provide light to remote work areas or job sites that do not have sufficient ambient lighting. Some work lights are compact or configurable into compact configurations, allowing the work lights to be repositioned and easily transported to and from job sites.

SUMMARY OF THE INVENTION

In one embodiment, the invention provides a light stand including a telescoping assembly having a longitudinal axis, a light selectively coupled to the telescoping assembly, and a support assembly having legs coupled to the telescoping assembly. The support assembly is moveable between a collapsed position and an operating position. The light stand further includes a positioning linkage coupled between the light and the telescoping assembly for enabling the light to be oriented in a variety of positions. The positioning linkage includes a first adjustment axis about which the light rotates. The first adjustment axis is perpendicular to the longitudinal axis. The positioning linkage also includes a second adjustment axis about which the light rotates. The second adjustment linkage is perpendicular to the first adjustment axis. The positioning linkage further includes a third adjustment axis about which the light rotates. The third adjustment axis is perpendicular to a length of the second adjustment axis.

In another embodiment, the invention provides a light stand including a telescoping assembly having a longitudinal axis, a light having a latching mechanism for selectively coupling the light to the light stand, and a support assembly having legs coupled to the telescoping assembly. The support assembly is moveable between a collapsed position and an operating position. The light stand further includes a light holder that receives the light for mounting the light to the light stand. The latching mechanism is moveable between a first position, in which the latching mechanism couples to a corresponding protrusion on the light holder to selectively couple the light to the light holder, and a second position, in which latching mechanism disengages the protrusion thereby allowing the light to be removed from the light holder.

In yet another embodiment, the invention provides a light stand configured to support a light. The light stand include a telescoping assembly having a longitudinal axis, a light holder coupled to the telescoping assembly and configured to receive the light for mounting the light to the light stand, and a support assembly having legs coupled to the telescoping assembly. The support assembly is moveable between a collapsed position and an operating position. The light stand also includes a positioning linkage coupled between the light holder and the telescoping assembly for enabling the light holder to be oriented in a variety of positions. The positioning linkage includes a first adjustment axis about which the light rotates. The first adjustment axis is perpendicular to the longitudinal axis. The positioning linkage also includes a second adjustment axis about which the light rotates. The second adjustment axis is perpendicular to the first adjustment axis. The positioning linkage further includes a third adjustment axis about which the light rotates. The third adjustment axis is perpendicular to a length of the positioning linkage.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
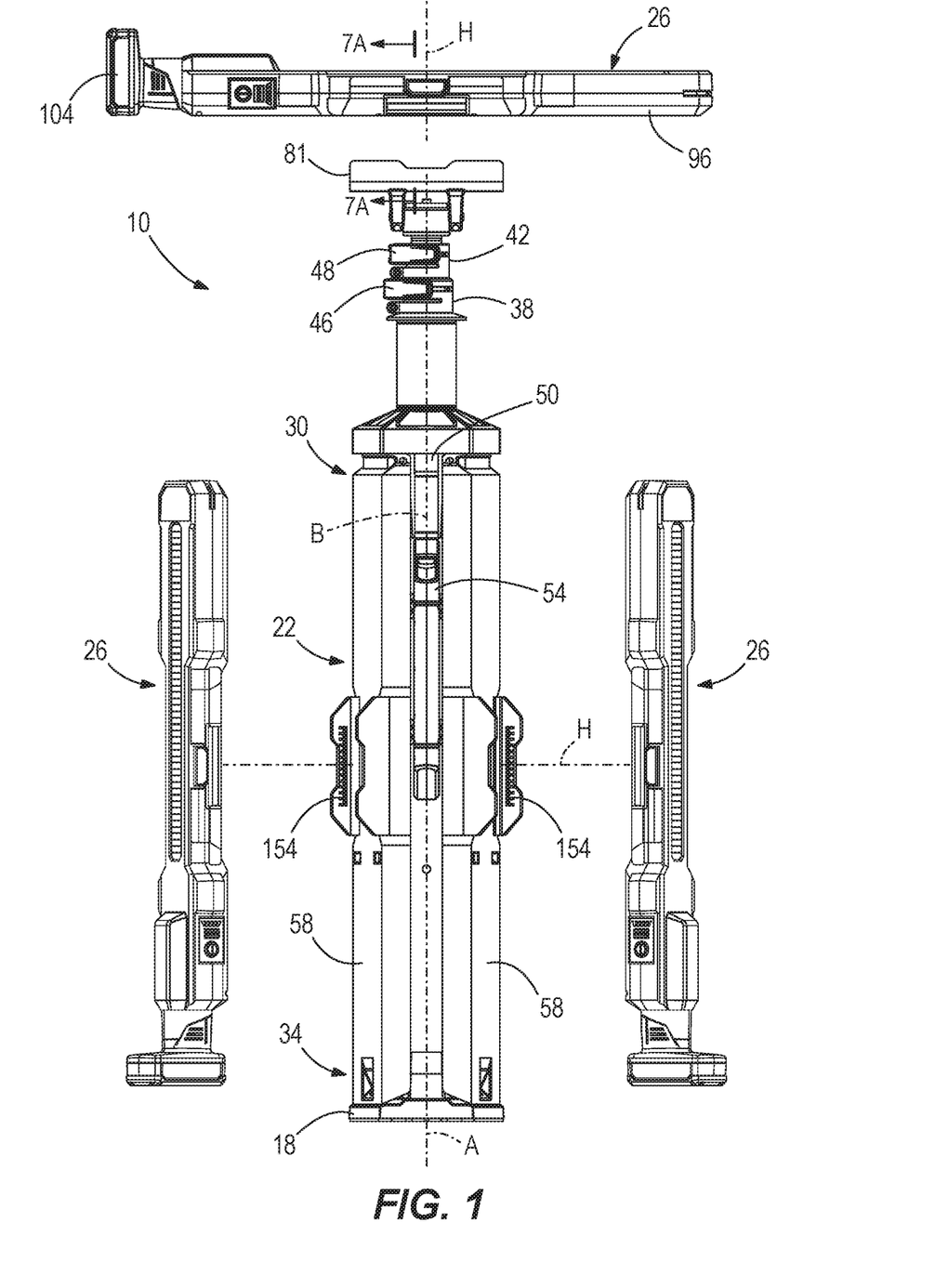
FIG. 1 is a side view of a light stand, the light stand including a support assembly in a collapsed position, a telescoping assembly in a collapsed position, and a light coupleable to the light stand.
Figure 2:
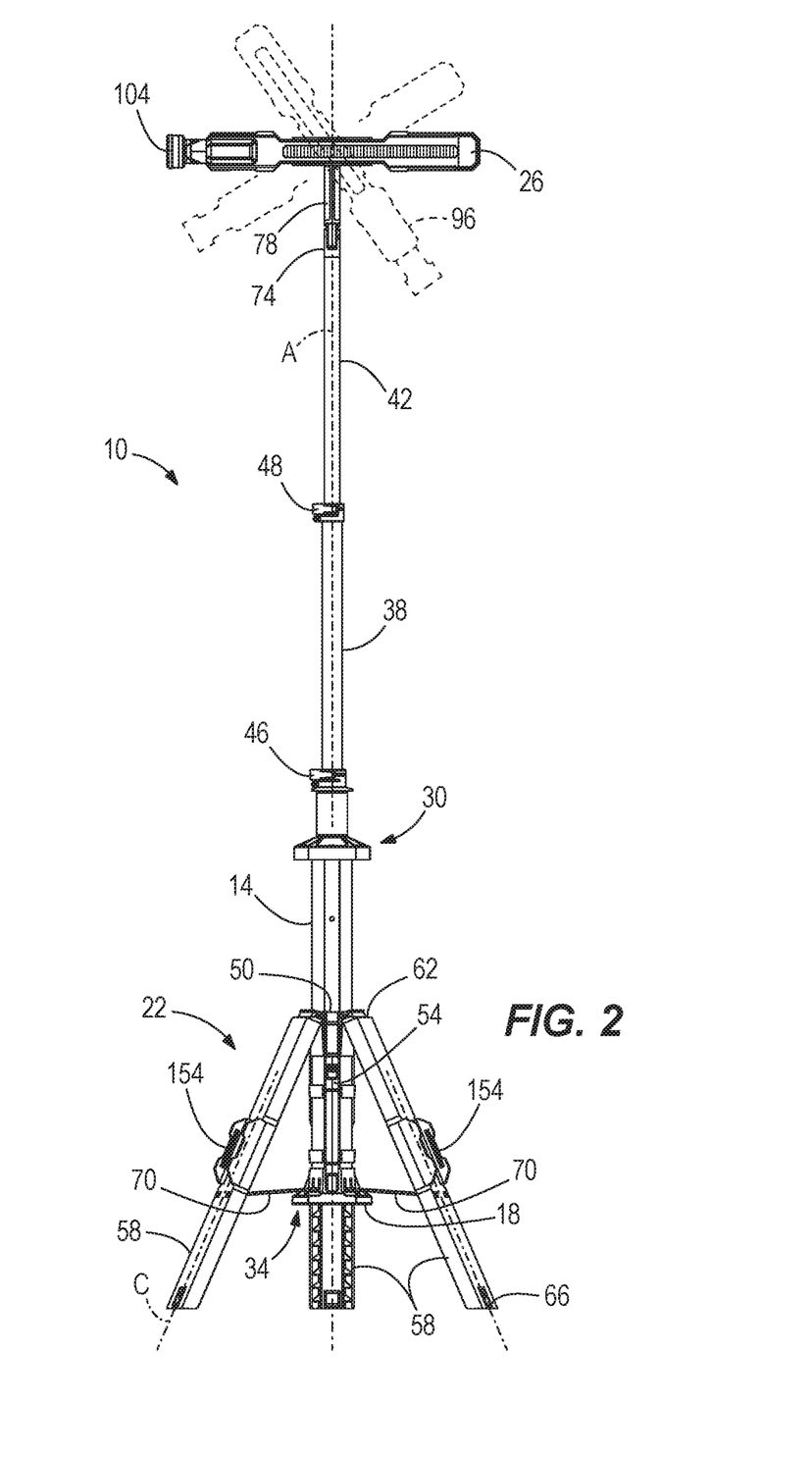
FIG. 2 is a side view of the light stand of FIG. 1, illustrating the support assembly in an expanded position and the telescoping assembly in an extended position.

FIGS. 1-2 illustrate a light stand 10 including an elongate body 14, a base housing 18, and a support assembly 22. A light 26 is supported by and removably coupled to the support assembly 22. The light stand 10 is configurable in either a collapsed position, as shown in FIG. 1, or a deployed, operating position, as shown in FIG. 2. In the collapsed position, the light stand 10 is relatively compact for storing and transporting. In the operating position, the light stand 10 may be self-supported on a surface.

With continued reference to FIGS. 1-2, the base housing 18 includes a first, top end 30 and a second, bottom end 34 opposite the top end 30. The base housing 18 further includes a longitudinal axis A that extends through the first end 30 and the second end 34.

With reference to FIG. 2, in the illustrated embodiment, the elongate body 14 is a telescoping body that includes a telescoping assembly 36 to allow the body 14 to be extendable in length. The illustrated body 14 includes a first extension pole 38 and a second extension pole 42. In alternate embodiments, any number of extension poles may be used. The extension poles 38, 42 are coaxial with the longitudinal axis A of the elongate body 14. Additionally, the extension poles 38, 42 are selectively secured in either an extended position (FIG. 2), a retracted position (FIGS. 1), or any position in between by clamping assemblies 46, 48 that are movable between a clamped position and an unclamped position.

Figure 3:
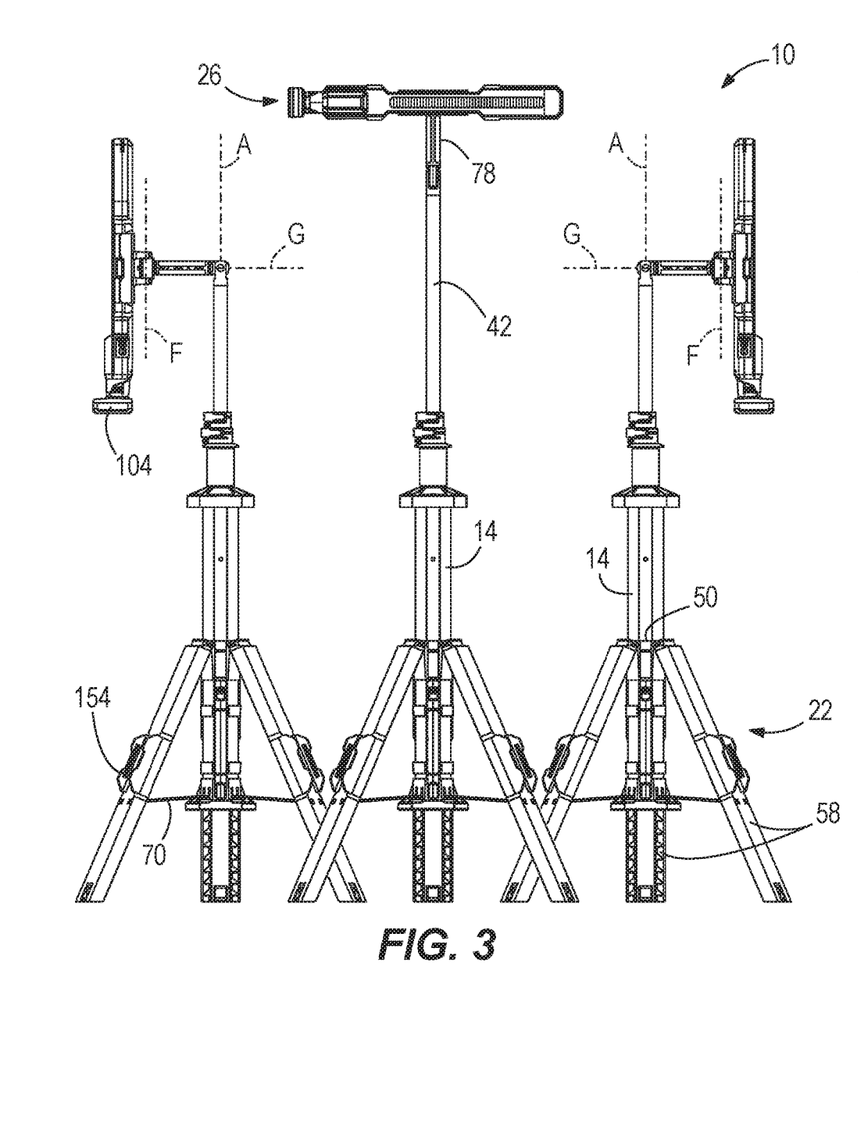
FIG. 3 includes side views of the light stand of FIG. 2 with the light oriented in a variety of positions.

With reference to FIGS. 1-3, the support assembly 22 includes a collar 50, a handle 54, and a plurality of legs 58. The collar 50 is coupled around a portion of the elongate body 14. The collar 50 is movable (e.g., slidable) along the elongate body 14 in directions parallel to the longitudinal axis A. The handle 54 is coupled to the collar 50 for movement with the collar 50.

With continued reference to FIGS. 1-3, the handle 54 is coupled around the elongate body 14 and configured to slide along the body 14 parallel to the longitudinal axis A of the elongate body 14. In the illustrated embodiment, the handle 54 has a grip axis B (FIG. 1) that is generally parallel to and offset from the longitudinal axis A of the elongate body 14. The handle 54 is coupled to the collar 50 such that sliding the handle 54 along the body 14 moves the collar 50 along the body 14. In the collapsed position, the handle 54 is adjacent the first end 30 of the body 14, and facilitates carrying the light stand 10. In the expanded position, the handle 54 is adjacent the second end 34 of the body 14.

In the illustrated embodiment, the three legs 58 each have a longitudinal axis C, as illustrated in FIG. 2. In alternate embodiments, the support assembly 22 may include any number of legs 58. Each leg 58 has a first end 62 and a second end 66. The legs 58 are circumferentially spaced equidistant around the elongate body 14 by about 120 degrees. Each leg 58 is hingedly coupled at the first end 62 of the legs 58 to the collar 50 to allow the second end 66 of the legs 58 to be pivoted away from the body 14. In addition, the support assembly 22 further includes three leg links 70 (one leg link 70 for each of the three legs 58) that is pivotally coupled between the second end 34 of the body 14 and the legs 58. The leg links 70 limit the outward pivotal movement of the legs 58. Thus, the legs 58 are connected to the collar 50 and the leg links 70. When the collar 50 is adjacent the first end 30 of the body 14, the light stand 10 is in the collapsed position (FIG. 1). In the collapsed position, the axis C of each of the legs 58 is generally parallel with the axis A of the body 14. When the collar 50 is adjacent the second end 34 of the body 14, the light stand 10 is in the deployed, operating position (FIG. 2). In the operating position, the legs 58 are pivoted away from the body 14 such that each of the axes C of the legs 58 forms an acute angle with the axis A of the body 14. The second end 66 of each leg 58 is spaced apart to support the light stand 10 on a surface.

Figure 4:
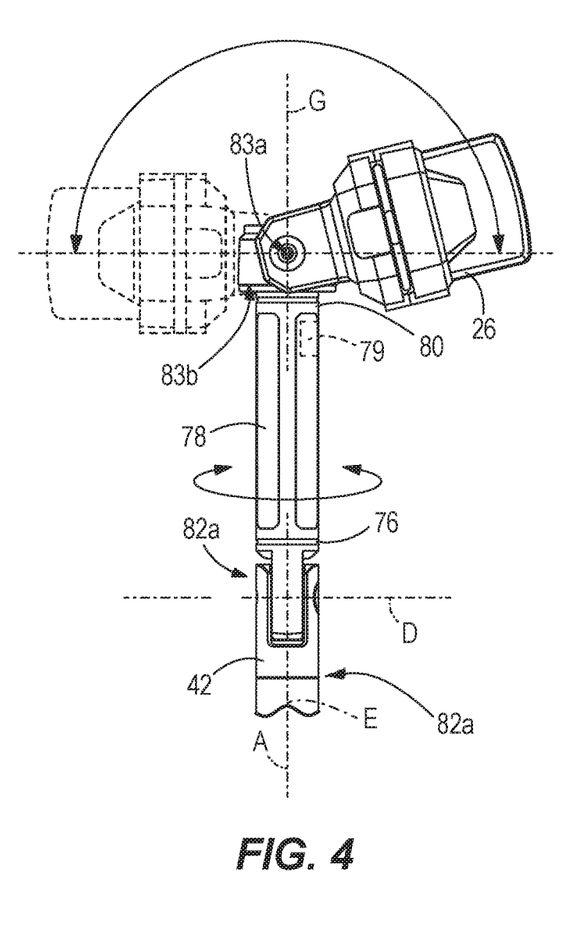
FIG. 4 is an enlarged side view of the light stand and the light coupled to the light stand.

With reference to FIGS. 3-4, the light 26 is coupled to the second extension pole 42, thus allowing a height of the light 26 to be adjustable via the extension poles 38, 42 between the extended position and the retracted position. Specifically, the second extension pole 42 is coupled to a first end 76 of a light positioning linkage 78. The light positioning linkage 78 also includes a second end 80 that supports a light holder 81 to which the light 26 is coupled. At the first end 76 of the positioning linkage 78 is a first adjustment joint 82a and a second adjustment joint 82b, while the second end 80 includes a third adjustment joint 83a and a fourth adjustment joint 83b. The positioning linkage 78 further includes an actuator 79 (e.g., a button) and two separate axes of rotation or adjustability—a first adjustment axis D defined at the first adjustment joint 82a and a second adjustment axis E defined at the second adjustment joint 82b. The light holder 81 (FIG. 1) also includes two separate axes of rotation or adjustability—a third adjustment axis F defined at the third adjustment joint 83a and a fourth adjustment axis G defined at the fourth adjustment joint 83b. As such, the linkage 78 and the light holder 81 provide four separate degrees of freedom, allowing the light 26 to be positioned in a variety of orientations relative to the extension poles 38, 42.

The light 26 is rotatable about the first adjustment axis D via the first adjustment joint 82a, which is extending through the page according to the frame of reference of FIG. 3. The first adjustment axis D is perpendicular to the longitudinal axis A and allows the positioning linkage 78 to be oriented substantially co-linear or perpendicular to the longitudinal axis A. The first adjustment joint 82a enables the light 26 to pivot through approximately 180 degrees of rotation, as depicted in FIG. 3. A user actuates the button 79 to permit free movement of the positioning linkage 78 about the first adjustment axis D. The actuator 79 provides a positive latch to inhibit free movement of the positioning linkage 78. In contrast, some of the other joints (e.g., joints 82a, 83a, 83b) of the linkage 78 are friction fit joints such that applying a sufficient force to overcome the friction at the particular joint results in movement of the linkage 78, as explain in further detail below.

The light 26 is further and separately rotatable about the second adjustment axis E via the second adjustment joint 82a, allowing the light 26 to spin through 360 degrees of rotation. The second adjustment axis E and the longitudinal axis A are collinear. The second adjustment axis E is perpendicular to the first adjustment axis D. The second adjustment joint 82b allows the light 26 to rotate 360 degrees about the longitudinal axis A. When the positioning linkage 78 is perpendicular to the extension poles 38, 42, the light 26 is capable of rotating 360 degrees about adjustment axis E. During movement about the second adjustment axis E, the light 26 is maintained in discrete positions via a friction fit.

The light 26 is also rotatable about the third adjustment axis F via the third adjustment joint 83a, which is extending through the page according to the frame of reference of FIG. 4. The third adjustment axis F is perpendicular to the second adjustment axis E and allows the light 26 to pivot relative to the positioning linkage 78. The third adjustment joint 83a enables the light 26 to pivot through approximately 180 degrees of rotation, as depicted in FIG. 4. During movement about the third adjustment axis F, the light 26 is maintained in discrete positions via a friction fit. Alternatively, the light positioning linkage 78 may include a spring loaded ratchet mechanism, or another mechanism, configured along each axes D, E, F to releasably secure the light 26 in the various, discrete positions as previously described.

Lastly, the light 26 is rotatable about the fourth adjustment axis G via the fourth adjustment joint 83b, which extends in a direction parallel to the positioning linkage 78. The fourth adjustment axis G is perpendicular to the third adjustment axis F and allows the light 26 to pivot relative to the positioning linkage 78. The fourth adjustment joint 83b enables the light 26 to spin through 360 degrees of rotation. During movement about the fourth adjustment axis G, the light 26 is maintained in discrete positions via a friction fit.

Figure 5:
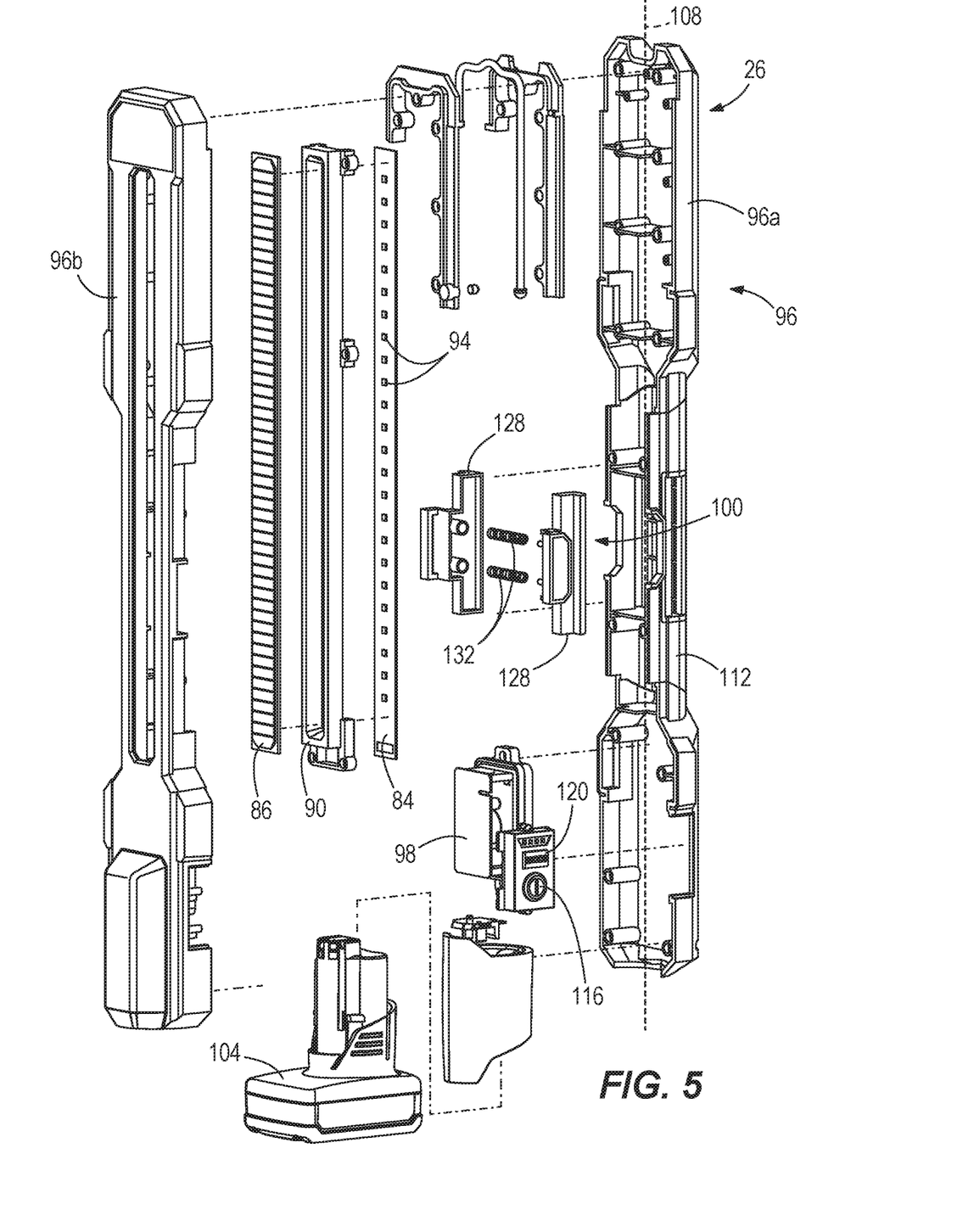
FIG. 5 is an exploded perspective view of the light, illustrating a latching mechanism for selectively coupling the light to the light stand.

With reference to FIG. 5, the light 26 includes a light panel 84 that contains a light source, a lens 86, and a reflector 90. The light panel 84 include a plurality of light emitting diodes (LEDs) 94 arranged in an array to provide uniform illumination of an area. In alternate embodiments, various light sources may be used in place of the LEDs 94. The light 26 further includes an elongate body 96 (formed by two half shells 96a, 96b) that houses the light panel 84, a main PCB 98, and a latching mechanism 100. In some embodiments, a battery pack 104 is provided on the elongate housing 96 to selectively supply power to the light 26. The battery pack 104 is a power tool battery pack that is removably coupled to the elongate housing 96 and usable to power other lights or power tools. The battery pack 104 enhances the portability of the light 26. In an alternative embodiment, an electric cord is contained within the elongate body 14 and the extension poles 38, 42 to electrically supply power to the light 26. The elongate body 96 defines a main axis 108 extending along the length of the body 96. In the illustrated embodiment, the battery pack 104 is inserted into the elongate body 96 in a direction along the main axis 108. The light 26 further includes a handle 112, a power button 116, and a light intensity button 120 disposed adjacent the handle 112. The light 26 is coupled to the light stand 10 via the handle 112 and the latching mechanism 100, as described below in more detail.

Figure 6:
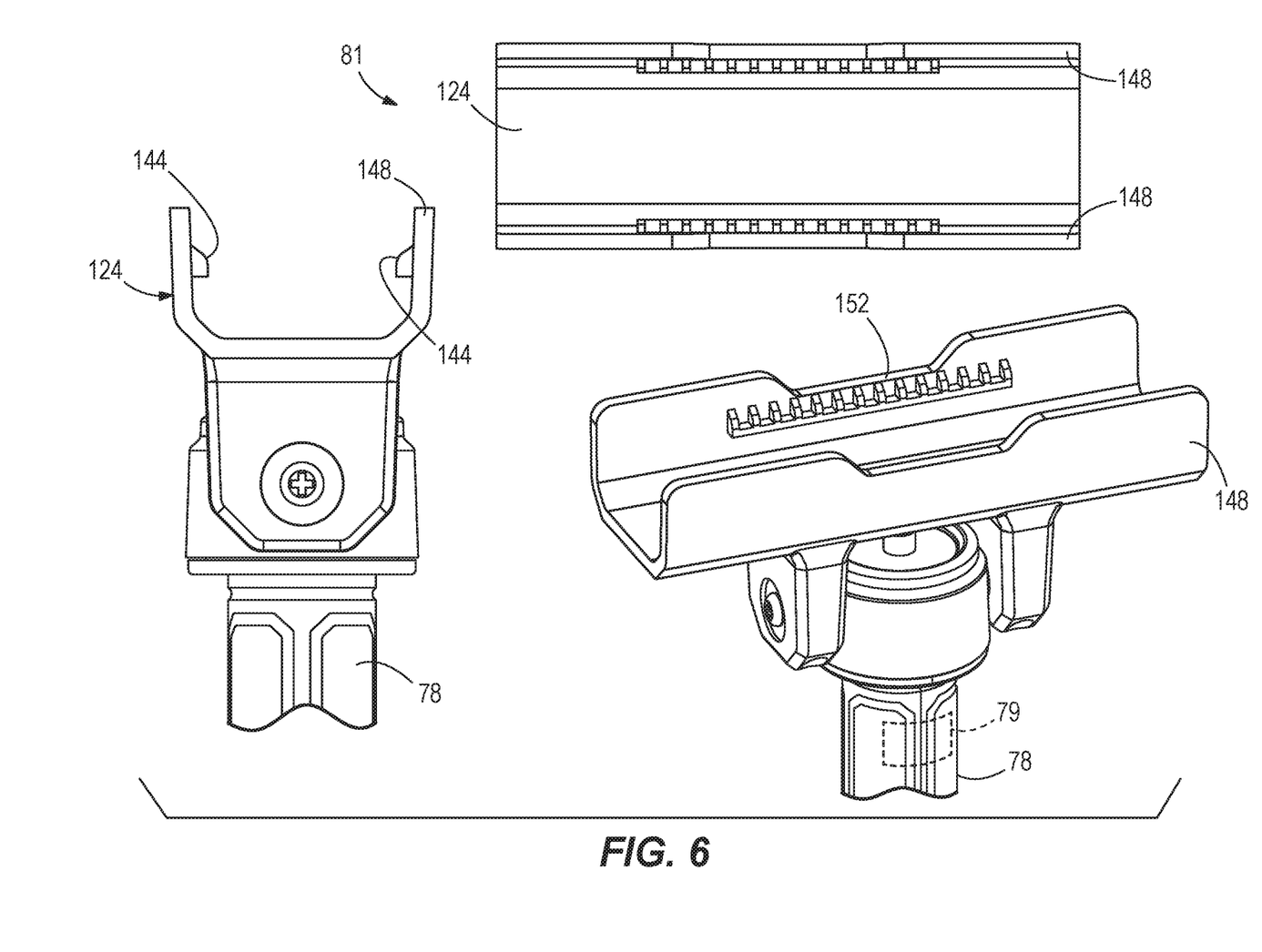
FIG. 6 includes enlarged views of a light holder of the light stand for mounting the light.
Figures 7A, 7B:
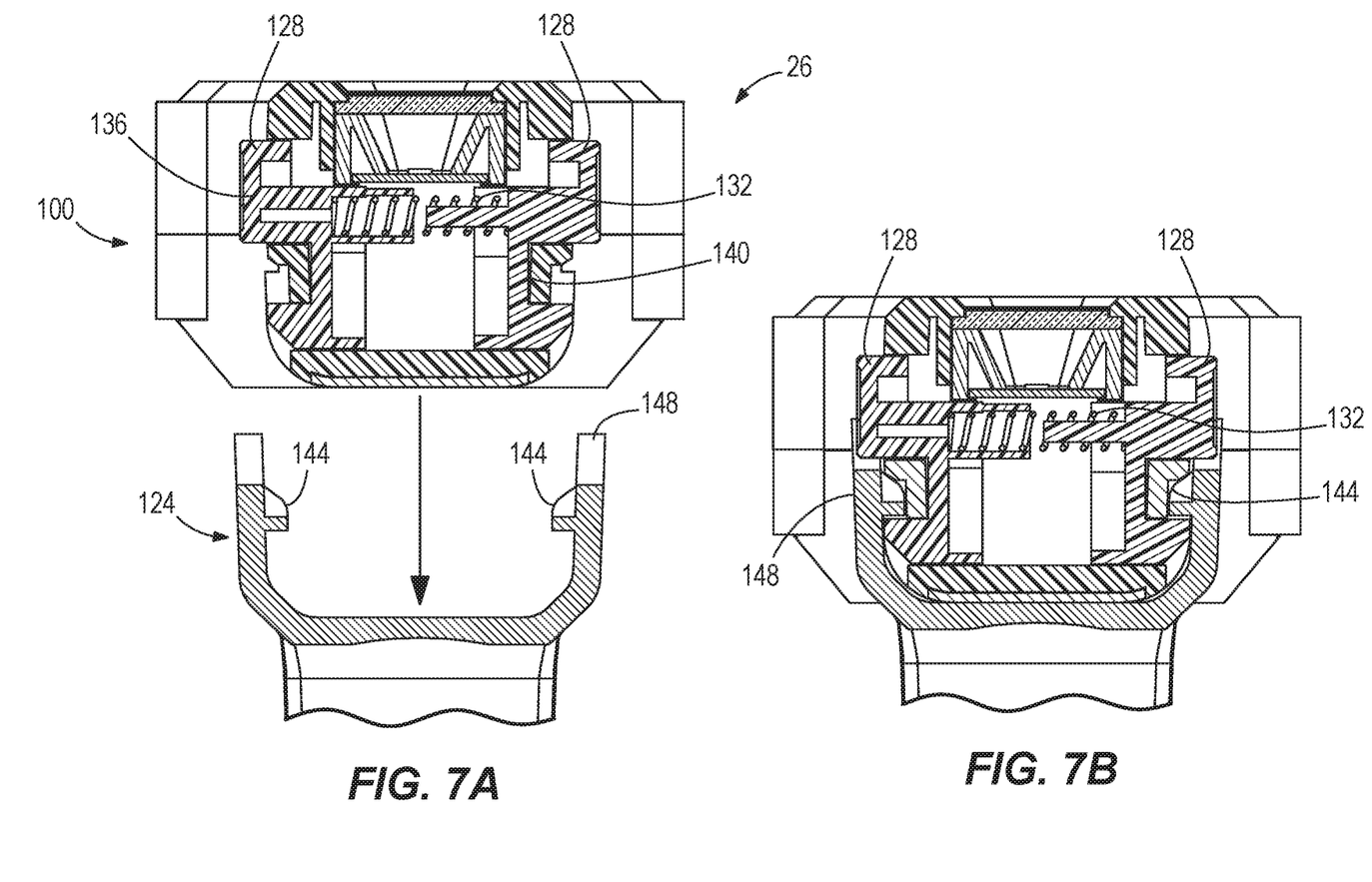
FIG. 7A is a cross-sectional view of the light and the light holder, illustrating the latching mechanism removed from the light holder.
FIG. 7B is a cross-sectional view of the light and the light holder, illustrating the latching mechanism interfacing with the light holder.
Figure 8:
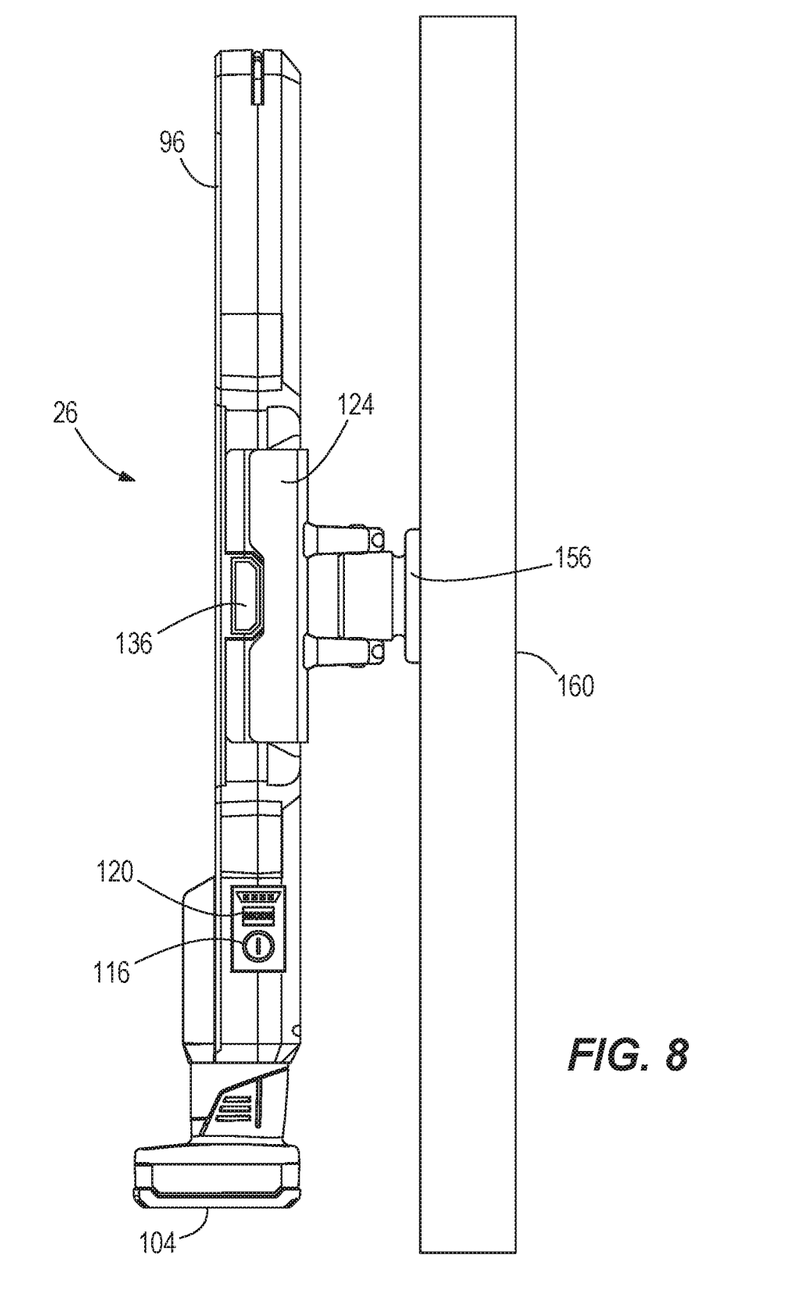
FIG. 8 is a side view of a light stand in accordance with another embodiment of the invention.

With reference to FIGS. 6 and 7, the latching mechanism 100 and the handle 112 both interface with the light holder 81 and, more specifically, a rail system 124 of the light stand 10 to selectively couple the light 26 to the light stand 10. The handle 112 is disposed approximately in the middle of the light 26 along the main axis 108 for ergonomic benefits. Generally, the latching mechanism 100 is a quick-disconnect coupling that enables the light 26 to be efficiently removed from and reattached to the light stand 10. The latching mechanism 100 includes two latches 128 and a pair of springs 132 disposed between the latches 128 to bias the latches 128 away from each other (FIG. 7B). Each latch 128 includes a pressing surface 136 for allowing a user to depress the latches 128 inwardly (FIG. 7A). Each latch 128 further includes a groove 140 for receiving a portion of the rail system 124. Specifically, the grooves 140 receive corresponding protrusions 144 disposed on upright walls 148 of the rail system 124. The protrusions 144 project inwardly toward each other and the grooves 140. The rail system 124 further includes a cut-out region 152 in the upright walls 148 to allow a user access to the pressing surface 136 when the light 26 is mounted to the rail system 124, as illustrated in FIG. 8. In some embodiments, the rail system 124 is coupled atop the positioning linkage 78. Referring back to FIG. 1, a similar light holder and rail system 154 is also provided on each leg 58 of the support assembly 22 to allow up to an additional three lights 26 to be mounted to the light stand 10 for storage. Therefore, a total of four lights 26 can be simultaneously stored and/or used on the light stand 10.

The rail system 124 may be incorporated with various accessories for the light stand 10, such as a magnetic mount 156 or other like components (e.g., adhesive-based mount, suction cup mount, etc.), as shown in FIG. 8. The magnetic mount 156 enables the light 26 to be mounted to a variety of surfaces 160, such as HVAC venting, metallic tool boxes, metal piping, metal car body, vehicular engine bay, vehicle chassis, hydraulic car lift, etc. The magnetic mount 156 having the rail system 124 may also be coupled to the light stand 10 (e.g., to the extension pole 42 or to one of the legs 58) for storage purposes. In other embodiments, the positioning linkage 78 may include, for example, a negatively polarized magnet to selectively receive a reciprocal positively polarized magnet of the magnetic mount 156 for selectively mounting the light 26 atop the light stand 10.

Referring back to FIGS. 1 and 2, during use to deploy the light stand 10 into the operating position (from the collapsed position), a user grasps the handle 54 and slides the handle 54 downwardly along base housing 18 to cause the legs 58 to pivot outwardly into the operating position as shown in FIG. 2. As the first ends 62 of the legs 58 approach the second end 34 of the housing 18, the second ends 66 of the legs 58 are pivoted outwardly until the leg links 70 inhibit further movement. In the operating position, the light stand 10 may be supported on the ground or an operating surface such that the axis A of the housing 18 is generally vertical (i.e., perpendicular to the ground or the operating surface).

To return the light stand 10 to the collapsed or storage position to transport or store the light stand 10, a user grasps the handle 54 and slides the handle 54 toward the first end 30 of the base housing 18 (i.e., upwardly to cause the legs 58 to pivot inwardly into the collapsed position) as shown in FIG. 1. As the collar 50 moves upward, the legs 58 pivot inward about the first ends 62 of the legs 58, and the leg links 70 fold inwardly.

When in the operating position, the light 26 may be extended from the elongate body 14 by moving the clamping assembly 46 to the unclamped position, thus allowing for adjustment in height of the telescoping assembly via the extension poles 38, 42.

To control power to the light 26, a user actuates the power button 116, pressing the power button 116 to turn power on/off. To increase the light intensity of the light 26 by a predetermined increment, the user actuates the intensity button 120.

If, for example, the light stand 10 is in the collapsed position and the light 26 is stored via the rail system 154 on one of the legs 58, a user simply depresses the latches 128 (FIG. 7A) of the latching mechanism 100 and pulls the light 26 away from the rail system 154.

Specifically, a user pulls the light along axis H (FIG. 1) which extends perpendicular to the rail system 154 until the grooves 140 of each latch 128 slides beyond the protrusions 144 of the rail system 154. Once the light stand 10 is in the operating position, a user may couple the light 26, for example, to the rail system 124 supported by the extension poles 38, 42. In order to do so, a user depresses the pressing surface 136 of each latch 128 and inserts the light 26 into the rail system 124 in a direction along the axis H. A user then releases the latches 128, at which point the spring 132 urges the latches 128 outward, causing the grooves 140 to receive the protrusions 144 (FIG. 7B). Instead of depressing the latches 128 while mounting the light 26 on the rail system 124, 154, a user can alternatively simply press the light 26 down into the rail system 124, 154. The latches 128 automatically bias inward and slide beyond the protrusions 144 due to corresponding chamfered edges on the latches 128 and the protrusions 144. However, a user must depress the latches 128 inward during removal of the light 26 from the rail system 124, 154.

The adjustability (four degrees of freedom) of the positioning linkage 78 and the light holder 81 were chosen to benefit the user. These orientations resulting from the degrees of freedom were chosen, for example, to benefit a drywall user when illuminating a work surface. Providing a user with too many degrees of freedom, however, may decrease the userability of the light stand 10 as the light stand 10 becomes cumbersome. Lastly, the light 26 in combination with the light stand 10 can be used for area lighting (e.g., illuminate an entire wall, ceiling, floor, etc.) or can also be used for task lighting (e.g., while closely inspecting a portion of the work surface).

Various features and advantages of the invention are set forth in the following claims.

What is claimed is:

1. A light stand comprising:
    a telescoping assembly having a longitudinal axis;
    a light selectively coupled to the telescoping assembly;
    a support assembly having legs coupled to the telescoping assembly, the support assembly being moveable between a collapsed position and an operating position; and
    a positioning linkage coupled between the light and the telescoping assembly for enabling the light to be oriented in a variety of positions, the positioning linkage including
        a first adjustment axis about which the light rotates, wherein the first adjustment axis is perpendicular to the longitudinal axis,
        a second adjustment axis about which the light rotates, wherein the second adjustment axis is perpendicular to the first adjustment axis, and
        a third adjustment axis about which the light rotates, wherein the third adjustment axis is perpendicular to a length of the positioning linkage.

2. The light stand of claim 1, wherein the positioning linkage further includes a fourth adjustment axis about which the light rotates, wherein the fourth adjustment axis is perpendicular to the third adjustment axis.

3. The light stand of claim 2, wherein the fourth adjustment axis and the longitudinal axis are collinear when the telescoping assembly and the positioning linkage are collinear.

4. The light stand of claim 2, wherein the fourth adjustment axis and the longitudinal axis are perpendicular relative to each other when the telescoping assembly and the positioning linkage are perpendicular relative to each other.

5. The light stand of claim 2, wherein the light is maintained in discrete positions about the fourth adjustment axis via a friction fit at a fourth adjustment joint.

6. The light stand of claim 1, wherein the positioning linkage pivots relative to the telescoping assembly about the first adjustment axis, such that the positioning linkage is capable of being at least one of collinear and perpendicular relative to the telescoping assembly.

7. The light stand of claim 6, wherein the positioning linkage further includes an actuator that, when actuated, allows the positioning linkage to pivot relative to the telescoping assembly about the first adjustment.

8. The light stand of claim 7, wherein the actuator, when not actuated, maintains the positioning linkage in a discrete position relative to the telescoping assembly via a positive latch.

9. The light stand of claim 1, wherein the second adjustment axis and the longitudinal axis are collinear.

10. The light stand of claim 1, wherein the light is maintained in discrete positions about the second adjustment axis via a friction fit at a second adjustment joint.

11. The light stand of claim 1, wherein the third adjustment axis and the longitudinal axis are perpendicular when the telescoping assembly and the positioning linkage are collinear.

12. The light stand of claim 1, wherein the light is maintained in discrete position about the third adjustment axis via a friction fit at the third adjustment joint.

13. A light stand comprising:
    a telescoping assembly having a longitudinal axis;
    a light having a latching mechanism for selectively coupling the light to the light stand;
    a support assembly having legs coupled to the telescoping assembly, the support assembly being moveable between a collapsed position and an operating position; and
    a light holder that receives the light for mounting the light to the light stand,
    wherein the latching mechanism of the light is moveable between a first position, in which the latching mechanism couples to a corresponding protrusion on the light holder to selectively couple the light to the light holder, and a second position, in which latching mechanism disengages the protrusion thereby allowing the light to be removed from the light holder.

14. The light stand of claim 13, wherein the latching mechanism includes latches and a spring disposed between the latches to bias the latches away from each other and toward the first position.

15. The light stand of claim 14, wherein the latching mechanism is provided adjacent to a handle of the light, such that the latching mechanism and the handle both interface with the light holder.

16. The light stand of claim 15, wherein the latching mechanism includes a pressing surface disposed on the handle of the light for enabling a user to depress the latches inwardly and toward the second position.

17. The light stand of claim 14, wherein each latch includes a groove for receiving the protrusion of the light holder.

18. The light stand of claim 14, wherein each latch includes a chamfered edge that is capable of sliding along the protrusion in a cam fashion when inserting the light into the light holder, such that the latches retract inwardly toward the second position.

19. The light stand of claim 13, wherein the light holder is coupled to at least one of the telescoping assembly and the legs of the support assembly.

20. A light stand configured to support a light, the light stand comprising:
    a telescoping assembly having a longitudinal axis;
    a light holder coupled to the telescoping assembly and configured to receive the light for mounting the light to the light stand;
    a support assembly having legs coupled to the telescoping assembly, the support assembly being moveable between a collapsed position and an operating position; and
    a positioning linkage coupled between the light holder and the telescoping assembly for enabling the light holder to be oriented in a variety of positions, the positioning linkage including
        a first adjustment axis about which the light rotates, wherein the first adjustment axis is perpendicular to the longitudinal axis,
        a second adjustment axis about which the light rotates, wherein the second adjustment axis is perpendicular to the first adjustment axis, and
        a third adjustment axis about which the light rotates, wherein the third adjustment axis is perpendicular to a length of the positioning linkage.

* * * * *